(12) United States Patent
Kim et al.

(10) Patent No.: US 10,261,581 B2
(45) Date of Patent: Apr. 16, 2019

(54) HEAD-MOUNTED DISPLAY CONTROLLED BY SIGHTLINE, METHOD FOR CONTROLLING SAME, AND COMPUTER PROGRAM FOR CONTROLLING SAME

(71) Applicant: FXGEAR INC., Seoul (KR)

(72) Inventors: Sung Wu Kim, Seoul (KR); Kwang Jin Choi, Seoul (KR)

(73) Assignee: FXGEAR INC., Seoul (KR)

( * ) Notice: Subject to any disclaimer, the term of this patent is extended or adjusted under 35 U.S.C. 154(b) by 62 days.

(21) Appl. No.: 15/511,608

(22) PCT Filed: Sep. 17, 2015

(86) PCT No.: PCT/KR2015/009763
§ 371 (c)(1),
(2) Date: Mar. 15, 2017

(87) PCT Pub. No.: WO2016/043537
PCT Pub. Date: Mar. 24, 2016

(65) Prior Publication Data
US 2017/0255256 A1    Sep. 7, 2017

(30) Foreign Application Priority Data
Sep. 18, 2014    (KR) ........................ 10-2014-0124038

(51) Int. Cl.
*G06F 3/01* (2006.01)
*G09G 5/00* (2006.01)
(Continued)

(52) U.S. Cl.
CPC .............. *G06F 3/012* (2013.01); *G06F 3/013* (2013.01); *G09G 3/2092* (2013.01); *G09G 5/003* (2013.01);
(Continued)

(58) Field of Classification Search
CPC ......... G06F 3/012; G06F 3/013; G02B 27/02; G09G 5/003; G09G 2320/0261; G09G 2320/068
See application file for complete search history.

(56) References Cited

U.S. PATENT DOCUMENTS 8,482,527 B1    7/2013  Kim
9,081,181 B2    7/2015  Lee
(Continued)

FOREIGN PATENT DOCUMENTS

JP    11-161190 A    6/1999
JP    2008-33891 A    2/2008
(Continued)

OTHER PUBLICATIONS

PCT International Search Report, PCT/KR2015/009763, dated Dec. 9, 2015, 4 Pages.

*Primary Examiner* — Robert J Michaud
(74) *Attorney, Agent, or Firm* — Fenwick & West LLP

(57) ABSTRACT

A head-mounted display (HMD) may comprise: a sensor unit configured to measure the movement of a user wearing the HMD; a display unit configured to display an image; and a control unit configured to calculate the user's sightline direction from a measurement value from the sensor unit and, when the user's sightline direction satisfies a preset condition, control elements of the image other than the viewpoint using the user's sightline as a input signal. When the user's sightline direction satisfies the preset condition, the HMD controls the image, which is displayed on the HMD, using the user's sightline as an input signal, thereby performing event processing and the like without any separate controller.

5 Claims, 4 Drawing Sheets

(51) Int. Cl.
 *G09G 3/20* (2006.01)
 *G02B 27/01* (2006.01)
(52) U.S. Cl.
 CPC ............. *G02B 2027/0187* (2013.01); *G09G 2320/0261* (2013.01); *G09G 2320/068* (2013.01); *G09G 2354/00* (2013.01)

(56) References Cited

U.S. PATENT DOCUMENTS

| | | |
|---|---|---|
| 2012/0293407 A1 | 11/2012 | Lee |
| 2013/0246967 A1 | 9/2013 | Wheeler et al. |
| 2014/0078043 A1 | 3/2014 | Kim |
| 2014/0078176 A1 | 3/2014 | Kim et al. |
| 2014/0191927 A1 | 7/2014 | Cho |
| 2014/0191946 A1 | 7/2014 | Cho et al. |
| 2014/0232620 A1 | 8/2014 | Fujigaki |
| 2015/0002394 A1 | 1/2015 | Cho et al. |
| 2015/0009132 A1* | 1/2015 | Kuriya .................... G06F 3/012 345/156 |

FOREIGN PATENT DOCUMENTS

| | | |
|---|---|---|
| JP | 2009-294372 A | 12/2009 |
| JP | 2010-12290 A | 1/2010 |
| JP | 2013-168910 A | 8/2013 |
| KR | 10-2012-0129134 A | 11/2012 |
| KR | 10-2014-0035861 A | 3/2014 |
| KR | 10-2014-0090549 A | 7/2014 |

* cited by examiner

[FIG. 1]
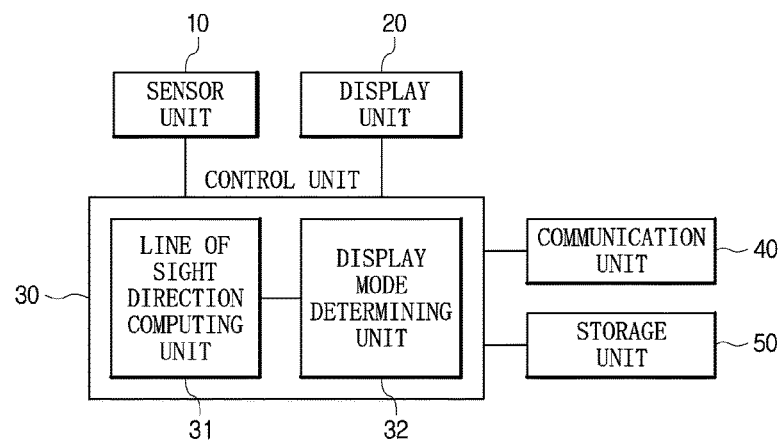
[FIG. 2]
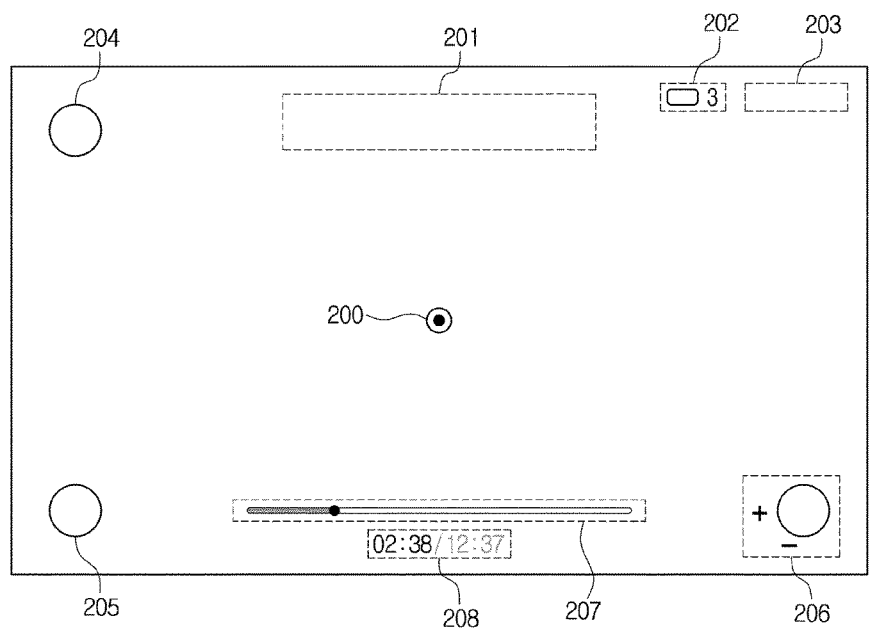

[FIG. 3A]
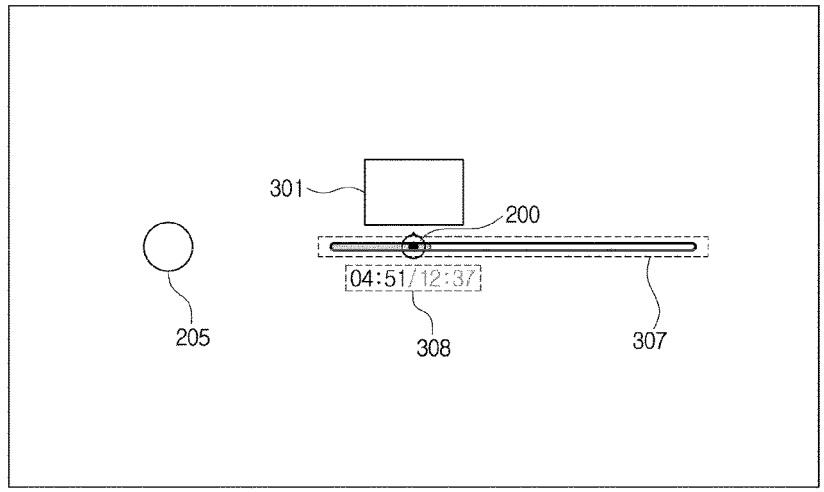
[FIG. 3B]
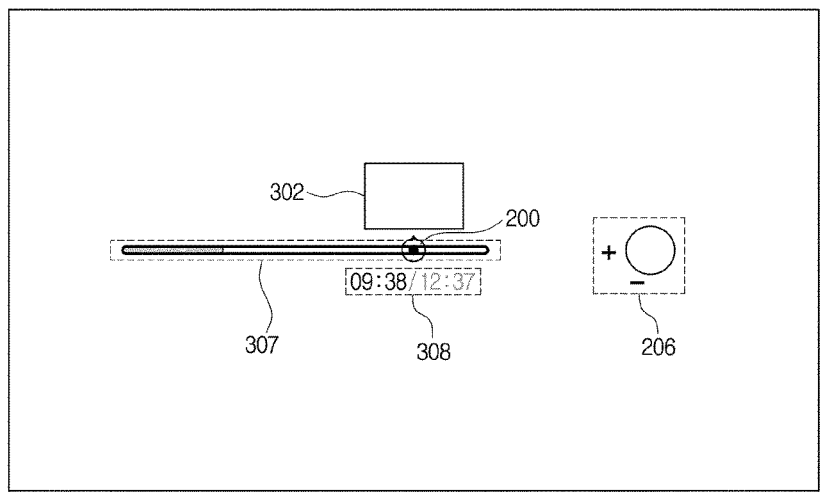

[FIG. 4]
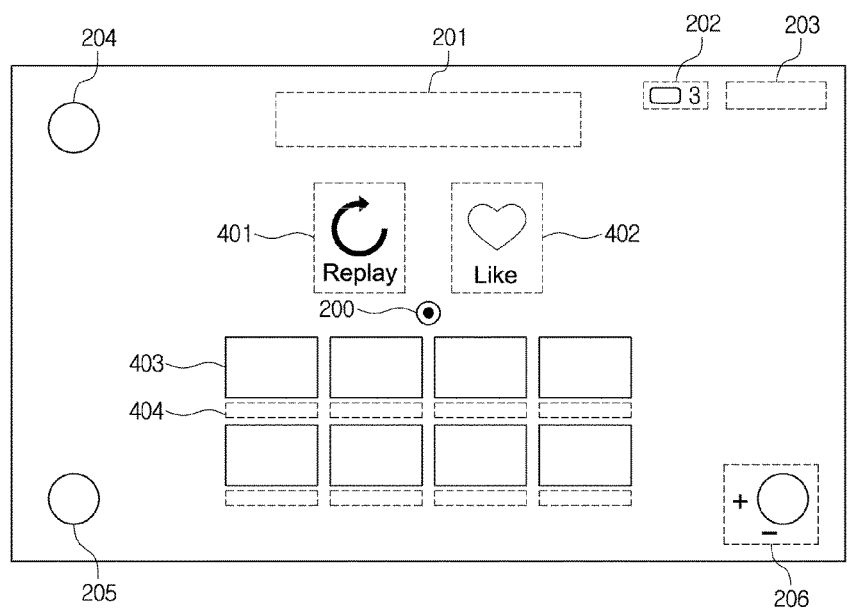

[FIG. 5]
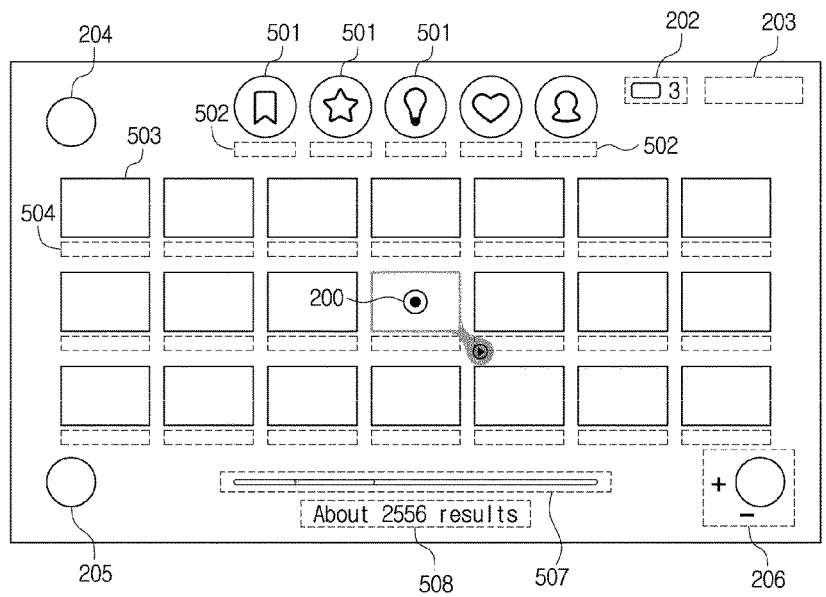

HEAD-MOUNTED DISPLAY CONTROLLED BY SIGHTLINE, METHOD FOR CONTROLLING SAME, AND COMPUTER PROGRAM FOR CONTROLLING SAME

TECHNICAL FIELD

Embodiments relate to a head-mounted display (HMD) and a method and computer program for controlling the same, and more particularly, to a HMD configured to be controlled by a user's line of sight without a separate controller and its control technology.

BACKGROUND ART

A head-mounted display (HMD) is a portable display device worn on a head, and is an apparatus having a display device that is mounted on a head in the form of, for example, goggles or a helmet to define a focal point of an image at a very short distance in front of eyes. A user wearing a HMD feels in a virtual reality because the entire field of view is covered by an image, and thus a HMD has applications in various fields for military, medical and personal uses.

For example, Japanese Patent Application Publication No. 1999-161190 discloses detecting a motion of a head part of a user, and controlling information displayed on a display device through the detected results. However, a disadvantage of this conventional HMD is that the user's motion is only used to change the viewpoint displayed on the display device, and in order to perform control such as event processing of the displayed information, a separate controller, for example, a touch pad and a game pad is needed.

DISCLOSURE

Technical Problem

According to an aspect of the present disclosure, a head-mounted display (HMD) configured to control an image displayed on the HMD by a user's line of sight without a separate controller, and a method for controlling the same and a computer program therefor are provided.

Technical Solution

A head-mounted display (HMD) according to an embodiment includes: a sensor unit configured to measure a motion of a user wearing the HMD; a display unit configured to display an image; and a control unit configured to compute the line of sight direction of the user from a measurement value of the sensor unit, and control an element other than viewpoint of the image using the line of sight of the user as an input signal when the line of sight direction of the user satisfies a preset condition.

The control unit may be configured to use the line of sight of the user as the input signal in response to the line of sight direction of the user being maintained constantly for a preset period of time.

Furthermore, the control unit may be configured to use the line of sight of the user as the input signal in response to the line of sight direction of the user matching a preset direction.

The control unit may be configured to change at least one of a type, an output region, an output form, and a play speed of the image displayed on the display unit using the line of sight of the user as the input signal.

The control unit may be further configured to control the display unit to operate in a first mode and a second mode shifting between, the first mode in which the image displayed on the display unit changes in viewpoint based on the line of sight direction of the user, and the second mode in which the element other than viewpoint of the image is controlled using the line of sight of the user as the input signal.

A method for controlling a HMD according to an embodiment includes: displaying an image on the HMD; computing a line of sight direction of a user wearing the HMD; and controlling an element other than viewpoint of the image displayed on the HMD using the line of sight of the user as an input signal when the line of sight direction of the user satisfies a preset condition.

The controlling of an element other than viewpoint of the image may include determining the line of sight of the user as the input signal in response to the line of sight direction of the user being maintained constantly for a preset period of time.

Furthermore, the controlling of an element other than viewpoint of the image may include determining the line of sight of the user as the input signal in response to the line of sight direction of the user matching a preset direction.

The controlling of an element other than viewpoint of the image may include changing at least one of a type, an output region, an output form, and a play speed of the image displayed on the HMD using the line of sight of the user as the input signal.

The controlling of an element other than viewpoint of the image may include controlling the HMD to operate in a first mode and a second mode shifting between, the first mode in which the image displayed on the HMD changes in viewpoint based on the line of sight direction of the user, and the second mode in which the element other than viewpoint of the image is controlled using the line of sight of the user as the input signal.

A computer program according to an embodiment may be stored in a medium to perform the method for controlling a HMD in combination with the HMD.

Advantageous Effects

Using the head-mounted display (HMD) according to an aspect of the present disclosure and the method for controlling the same, an image displayed on the HMD is controlled using a user's line of sight as an input signal when the user's line of sight direction satisfies a preset condition, enabling event processing without a separate controller.

DESCRIPTION OF DRAWINGS

FIG. 1 is a block diagram of a head-mounted display (HMD) according to an embodiment.

FIG. 2 is a schematic diagram showing a display form of a HMD according to an embodiment.

FIGS. 3A and 3B are schematic diagrams showing an image control scheme using a line of sight in a HMD according to an embodiment.

FIG. 4 is another schematic diagram showing an image control scheme using a line of sight in a HMD according to an embodiment.

FIG. 5 is still another schematic diagram showing an image control scheme using a line of sight in a HMD according to an embodiment.

MODE FOR INVENTION

Hereinafter, the embodiments of the present disclosure will be described in detail with reference to the accompanying drawings.

FIG. 1 is a block diagram of a head-mounted display (HMD) according to an embodiment.

Referring to FIG. 1, the HMD according to this embodiment includes a sensor unit 10, a display unit 20, and a control unit 30. In an embodiment, the HMD may further include a communication unit 40 and/or a storage unit 50. The HMD according to this embodiment is designed to be worn on a head portion of a user, and may include one or more fixing means (not shown) according to needs. For example, the HMD according to the embodiments may be designed in the shape such as goggles or a helmet, but is not limited thereto.

The HMD according to the embodiments may have aspects of entirely hardware, entirely software, or partially hardware and partially software. For example, each "unit" that constitutes the HMD as used herein may collectively indicate hardware and operating software that enables the hardware to operate. Furthermore, hardware may be a data processing device including a computer processing unit (CPU) or other processor. Furthermore, software operated by hardware may indicate a process being executed, an object, an executable, a thread of execution, and a program.

Furthermore, each unit that constitutes the HMD according to the embodiments is not necessarily intended to indicate separate components that are physically distinguished from each other. Although FIG. 1 shows that the sensor unit 10, the display unit 20, and the control unit 30 are separate blocks distinguished from each other, some or all of the sensor unit 10, the display unit 20, and the control unit 30 may be integrated into one device according to the embodiments. For example, a smartphone equipped with a processing means such as a microprocessor, an acceleration sensor, and a touchscreen may correspond to at least one of the sensor unit 10, the display unit 20, and the control unit 30 described above, and such a smartphone may make up the HMD according to the embodiments in combination with other member (not shown) that can be mounted on a head. That is, the HMD as used herein may be a smartphone that can be used for being mounted on a head through other member.

The sensor unit 10 is a part for measuring a motion of a head of a user wearing the HMD. For this purpose, the sensor unit 10 may include one or more types of sensors to obtain a sensor measurement value for the user's motion. For example, the sensor unit 10 may include, but is not limited to, an accelerometer, a magnetometer, and/or a gyroscope. The measurement value obtained by the sensor unit 10 may be used to change a viewpoint corresponding to a displayed image based on the user's viewpoint, and on the other hand, may be used as an input signal for controlling an element other than viewpoint of the image when the measurement value satisfies a predetermined condition. Its detailed description will be provided below.

The display unit 20 is a part disposed near the eyes of the user to display an image. The display unit 20 may include a liquid crystal display (LCD) or other appropriate image display device. Furthermore, the display unit 20 may further include at least one optical device such as convex lens to define the focal point of the image displayed by the image display device on or near the eyes of the user. As used herein, the image displayed on the display unit 20 is intended to include a single image such as a photo or a series of continuous images such as a video. For example, contents such as a moving image including video and/or audio may be included in the image stated herein.

In an embodiment, the HMD may further include the communication unit 40, and the image displayed on the display unit 20 may be received from a remote server (not shown) via a network by the communication unit 40. For example, the communication unit 40 may receive the image by a streaming method. Furthermore, the HMD may transmit data to the remote server through the communication unit 40. In other embodiment, the image displayed on the display unit 20 may be pre-stored in the storage unit 50. The storage unit 50 includes a storage to store an image that will be displayed on the display unit 20 or other additional data.

The control unit 30 is communicatively connected to the sensor unit 10 and the display unit 20 to control the image displayed on the display unit 20 based on the measurement value obtained by the sensor unit 10. First, the control unit 30 may change the viewpoint corresponding to the image displayed on the display unit 20 based on the user's motion measured by the sensor unit 10. In outputting a part of a wide viewing angle image, the displayed part of the image is moved in response to the motion of the head of the user wearing the HMD, allowing the user to feel reality, in the same way as a display form used in traditional HMDs. For example, when the user turns his/her head to the right, the entire image displayed on the display unit 20 is moved to the left in response, allowing the user to feel as if the user turns his/her head to the right and sees the right side in a virtual space displayed by the image.

On the other hand, dissimilar to the prior art, the control unit 30 is further configured to compute the user's line of sight direction from the measurement value of the sensor unit 10, and when the user's line of sight direction satisfies a preset condition, to control an element other than viewpoint of the image using the user's line of sight as an input signal. The "element other than viewpoint" as used herein refers to a variety of events that can be processed in association with the image, and indicates a change in type, output region, output form, and playback speed of the image. For example, selection of an image to display, initiation and stop of image playing, and in the case where an image is a time series moving image, fast forward, rewind, increase and decrease in playback speed, increase and decrease in output volume, shift of display form such as full screen mode, and manipulation of a user interface such as a menu, a button or an icon displayed on the image may all correspond to control of an element other than viewpoint, but is not limited thereto. In the case where the image is a part of a game, virtual reality (VR) or augmented reality (AR) application, interaction with the application may be carried out through the user's motion.

The "element other than viewpoint" as used herein is described as a relative meaning to distinguish from changing viewpoints corresponding to the displayed image depending on the user motion, which is inherent in the HMD, and does not signify that an element controlled using the user's line of sight as an input signal is substantially irrelevant to viewpoint. The control unit 30 is configured to control the image displayed on the display unit 20 to change the viewpoint corresponding to the image based on the user's motion in the same way as general HMDs, and when the user's line of sight direction satisfies a specific condition, the control unit 30 does not use the user motion to change the viewpoint, and controls any other element of the image using the user's line of sight as an input signal. As a result, the user of the HMD can interact with the image only by his/her line of sight while wearing the HMD without a separate controller.

In an embodiment, the control unit 30 controls the display unit 20 to operate in a plurality of display modes including a first mode and a second mode shifting between. The first mode is a display form in which the viewpoint corresponding to the image displayed on the display unit 20 changes based on the user's motion in the same way as traditional HMDs, and the second mode is a display form in which an element other than viewpoint of the image displayed on the display unit 20 is controlled using the user's line of sight as an input signal. The shift between the first mode and the second mode may be made in response to the user's line of sight direction satisfying a specific condition, or may be made in response to the occurrence of a predefined context such as termination or shift of the image displayed on the display unit 20. The condition to be satisfied by the line of sight direction may be that the user's line of sight direction is maintained constantly, the line of sight direction faces a specific direction or location, or their combinations. However, the condition to be satisfied by the line of sight direction is not limited thereto, and may be determined as any different type of condition not stated herein.

In an embodiment, the control unit 30 includes a line of sight direction computing unit 32. The line of sight direction computing unit 32 is configured to compute a position in which the center of the user's line of sight is placed on the image displayed on the display unit 20 using the measurement value of the sensor unit 10. As the image displayed on the the display unit 20 moves to change in viewpoint based on the user's motion, the user's line of sight will be always disposed at the center of the screen the user sees. However, an absolute value of coordinates at which the user's line of sight is disposed in the image will change depending on a direction the line of sight faces, and it is referred to as line of sight direction information as used herein. The line of sight direction computing unit 32 may obtain the line of sight direction information by computing the movement of the user's line of sight using the sensor values measured by the sensor unit 10.

In this embodiment, the control unit 33 controls the image displayed on the display unit 20 using the user's line of sight as an input signal when the line of sight direction computed by the line of sight direction computing unit 32 satisfies a preset condition. Here, the preset condition may represent, for example, that the line of sight direction is maintained constantly or the line of sight direction faces a specific direction, and a detailed description will be provided below by referring to FIGS. 2 to 5.

In an embodiment, the control unit 30 further includes a display mode determining unit 33. The display mode determining unit 33 may shift the display mode of the display unit 20 between the first mode and the second mode in response to the line of sight direction computed by the line of sight direction computing unit 32 satisfying a specific condition. In this instance, the second mode may only last while a mode shift is made by the line of sight direction, and at the same time, the image is controlled by the line of sight, or the second mode may continue until a shift to the first mode is made again by a predetermined condition after a shift to the second mode. In the case where the second mode lasts, the user's line of sight is used as an input signal for control of an element other than viewpoint shift, after a shift to the second mode is made.

Hereinafter, an image control process of the HMD using the line of sight is described by referring to FIGS. 2 to 5 for illustration. However, this is just a detailed description of an implementation example of a process of controlling an element other than viewpoint by the user's line of sight, and is not intended to limit an image control scheme that can be achieved by the embodiments. That is, an element other than viewpoint of an image may be controlled by various methods that are different from those described below, and it is included in the scope of the present disclosure.

FIG. 2 is a schematic diagram showing a display form of the HMD according to an embodiment. FIG. 2 shows objects on the screen except content desired to see in an image displayed on the HMD. An original of the image for being displayed on the HMD may have a spherical shape to move a display region based on a user's line of sight, but for convenience of description, only a region that falls within the user's field of view in the whole image is depicted in a rectangular shape.

Referring to FIG. 2, an area 201 in which a title of content being played is displayed, an area 202 in which related social network service (SNS) metadata is displayed, an area 203 in which the time is displayed, a timeline bar 207, and a play time display area 208 may be displayed on the screen. Furthermore, one or more control icons 204, 205, 206 may be displayed on the screen. Each of the objects 201-208 is mapped to specific coordinates of the image displayed on the display unit, allowing the user to feel as if the objects 201-208 are present at a specific point in a virtual space the user is seeing.

A cursor 200 indicating the user's line of sight direction may be displayed on the screen. The screen the user of the HMD sees moves to change in viewpoint based on the user's line of sight direction. For example, when the user turns his/her head to the right, the whole image moves to the left in response. Accordingly, the cursor 200 is always disposed at the center of the screen the user sees. However, as the objects 201-208 are mapped to specific coordinates in the virtual space, the user places the cursor 200 on at least one of the objects 201-208 using the line of sight while the user sees the screen displayed on the HMD and can manipulate the objects 201-208, and this manipulation corresponds to control of the "element other than viewpoint" stated herein.

Hereinafter, for convenience of description, simply the movement of the cursor 200 is intended to represent that as the user changes the line of sight direction, the whole image displayed on the screen moves in response to the changed line of sight direction, and as a result, the cursor 200 at the center of the screen the user sees stays at specific coordinates in the image.

In an implementation example, in response to the user's staring at the screen, the objects 201-208 may not be displayed on the screen. That is, a shift to a full screen mode occurs in response to the user's line of sight being maintained constantly. Whether or not the user's line of sight is maintained constantly may be determined by a change in the line of sight direction less than or equal to a preset threshold for a preset period of time. For example, when the center point of the user's line of sight direction stays for 3 seconds or longer within a deviation of 15° from the line of sight direction at the point in which the motion stopped last, the line of sight direction may be determined to be maintained constantly. Subsequently, when the center point of the user's line of sight direction moves beyond 15°, the full screen mode is terminated and the objects 201-208 may be displayed again on the screen. The criterion for determining if the line of sight direction is constant is only for the purpose of illustration, and in other embodiments, a different criterion may be used.

In an implementation example, interaction with the objects 201-208 may be carried out by the user's staring at the objects 201-208. For example, the user may stare at any one of the icons 204, 205, 206 for a predetermined period of time to operate a function assigned to the corresponding icon. The functions that can be performed by the icons 204, 205, 206 include, but are not limited to, go back, play next content, call menu, enlarge image, and reduce image. Whether or not the user stared at the objects 201-208 may be determined by the same method as described above in relation to the full screen mode. Below is a description of manipulation of the timeline bar 207 using the line of sight as an example of interaction with the objects 201-208.

FIGS. 3A and 3B are schematic diagrams showing an image control scheme using the line of sight in the HMD according to an embodiment.

Referring to FIGS. 2, 3A and 3B, in response to the user's line of sight direction approaching within a predetermined range from the timeline bar 207, playing the content is stopped, and a timeline bar 307 with thicker edges is displayed. The cursor 200 corresponding to the user's line of sight direction moves to a location most adjacent to the timeline bar 307. Furthermore, a play time display area 308 moves below the cursor 200 and displays a play time at the position of the cursor 200, and a content thumbnail 301 of a part corresponding to the position of the cursor 200 is displayed immediately above the timeline bar 307. In this state, the user can move the cursor 200 as shown in FIG. 3B by moving the line of sight, and in this instance, the play time display area 308 also moves together with the cursor 200 and the content thumbnail changes to a thumbnail 302 of a part corresponding to the position of the cursor 200.

After movement to the time desired by the user has finished, when the user takes the cursor 200 off the timeline bar 307 by the line of sight, the timeline bar 307 returns to the timeline bar 207 as shown in FIG. 2 and playing the content starts.

FIG. 4 is another schematic diagram showing an image control scheme using the line of sight in the HMD according to an embodiment.

The screen shown in FIG. 4 is a screen showing multiple contents in the form of thumbnails, not content while being played, and the screen as shown in FIG. 4 may be displayed in response to specific content stopped playing or the user's manipulation of the icons 204, 205, 206. On the screen of FIG. 4, the objects 201-206 displayed while being played are displayed relatively darkly, and objects 401-404 are displayed relatively brightly to induce the user to select. The user may move the cursor 200 by the line of sight, and stare at the icon 401 to replay the content, or stare at the icon 402 to transmit a SNS feedback such as "Like" for the content. Alternatively, the user may stare at other content displayed in the form of the thumbnail 403 and the keyword 404 to select content to play next.

FIG. 5 is still another schematic diagram showing an image control scheme using the line of sight in the HMD according to an embodiment.

The screen of FIG. 5 may be a screen for selecting content to play from a total of available contents in the HMD or contents found by the user's search using a specific keyword. On the screen, multiple contents 503 and corresponding keywords 504 are displayed, and at the same time, a scroll bar 507 and a content number display area 508 are displayed, showing a total amount of contents. Furthermore, at least one function icon 501 and corresponding keyword 502 are displayed on the screen. The user may stare at the function icon 501 to perform the functions assigned to each icon 501, and for example, the function of the icon 501 includes, but is not limited thereto, displaying thumbnails of a predetermined specific content set on the screen.

When the user moves the line of sight to a further right side than thumbnails 503 currently displayed on the screen, the thumbnails 503 displayed on the screen move to the left and disappear and new thumbnails 503 appear from the right side, and at the same time, a bar in the scroll bar 507 moves, showing a relative position of the thumbnail set currently displayed in all the thumbnails. Alternatively, the user may move the thumbnails displayed on the screen by manipulating the scroll bar 507 by the line of sight in a similar way to that described above with reference to FIG. 3.

When the user sees any one thumbnail, the cursor 200 corresponding to the user's line of sight is disposed on the corresponding thumbnail. The thumbnail on which the cursor 200 is disposed is displayed relatively brightly as compared to other thumbnail, and is given edges having a glow effect, allowing the user to perceive that the corresponding thumbnail is selected. When the cursor 200 is disposed on the corresponding thumbnail for a predetermined period of time, the corresponding thumbnail is determined to be selected and playing of content corresponding to the selected thumbnail is initiated. As a result, a display shift to the content play screen as described above with reference to FIG. 2 is made.

The operation of the HMD and the method for controlling the same according to the embodiments as described hereinabove may be implemented, at least in part, as a computer program and recorded in a computer-readable recording medium. The computer-readable recording medium includes any type of recording device in which computer-readable data is stored. Examples of the computer-readable recording medium include ROM, RAM, CD-ROM, magnetic tape, floppy disks, and optical data storage devices, and include those embodied in the form of a carrier wave (for example, transmitted via the Internet). Furthermore, the computer-readable recording medium may be distributed over computer systems connected via a network, to store and execute computer-readable codes in a distribution fashion. Additionally, functional programs, codes and code segments for implementing this embodiment will be easily understood by persons having ordinary skill in the technical field to which this embodiment belongs.

While the present disclosure has been described hereinabove with reference to the embodiments shown in the drawings, this is for illustration only, and persons having ordinary skill in the art will understand that various modifications and variations in the embodiments can be made thereto. However, it should be noted that such modifications fall within the technical scope of protection of the present disclosure. Therefore, the true technical scope of protection of the present disclosure shall be defined by the technical spirit of the appended claims.

INDUSTRIAL APPLICABILITY

Embodiments relate to a head-mounted display (HMD) and a method and computer program for controlling the same.

The invention claimed is:
1. A head-mounted display, comprising:
a sensor unit configured to measure a motion of a user wearing the head-mounted display;
a display unit configured to comprise a screen, to display a part of a wide viewing angle image corresponding to the virtual space and comprising one or more objects mapped to specific coordinates in the virtual space as an image on the screen, to change a viewpoint of the image by moving the displayed part of the wide viewing angle image in response to the motion of a head of the user wearing the head-mounted display; and a control processor configured to compute coordinates in the virtual space in which a line of sight direction of the user is from a measurement value of the sensor unit, and control an element other than the viewpoint of the image using the line of sight of the user as an input signal when the coordinates in the line of sight direction is located at the one or more objects, wherein the control processor is configured to display a cursor indicating the line of sight direction of the user on the screen, wherein the control processor is further configured to operate in a first mode and a second mode shifting between the first mode and the second mode, the first mode in which the image displayed on the display unit changes in the viewpoint of the image based on the cursor indicating the line of sight direction of the user, and the second mode in which the element other than the viewpoint of the image is controlled using the cursor indicating the line of sight of the user as the input signal.

2. The head-mounted display according to claim 1, wherein the control processor is configured to change at least one of a type, an output region, an output form, and a playback speed of the image displayed on the display unit using the line of sight of the user as the input signal.

3. A method for controlling a head-mounted display, comprising:
- displaying a part of a wide viewing angle image corresponding to the virtual space and comprising one or more objects mapped to specific coordinates in the virtual space as an image on a screen on the head-mounted display;
- measuring a motion of a user wearing the head-mounted display by a sensor unit;
- changing a viewpoint of the image by moving the displayed part of the wide viewing angle image in response to the motion of a head of the user wearing the head-mounted display;
- computing, by a control processor, coordinates in the virtual space in which a line of sight direction of the user is from a measurement value of the sensor unit; and
- controlling, by the control processor, an element other than the viewpoint of the image using the line of sight of the user as an input signal when the coordinates in the line of sight direction is located at the one or more objects,
- wherein the controlling an element other than the viewpoint of the image comprises:
  - displaying, by the control processor, a cursor indicating the line of sight direction of the user on the screen,
- wherein the controlling an element other than the viewpoint of the image comprises:
  - operating, by the control processor, in a first mode and a second mode shifting between the first mode and the second mode, the first mode in which the image displayed on the display unit changes in the viewpoint of the image based on the cursor indicating the line of sight direction of the user, and the second mode in which the element other than the viewpoint of the image is controlled using the cursor indicating the line of sight of the user as the input signal.

4. The method for controlling a head-mounted display according to claim 3, wherein the controlling of an element other than viewpoint of the image comprises changing at least one of a type, an output region, an output form, and a playback speed of the image displayed on the head-mounted display using the line of sight of the user as the input signal.

5. A computer program product comprising a non-transitory computer-readable recording medium storing executable code, the code when executed causes the steps of:
- displaying a part of a wide viewing angle image corresponding to a virtual space and comprising one or more objects mapped to specific coordinates in the virtual space as an image on a screen on a head-mounted display;
- measuring a motion of a user wearing the head-mounted display by a sensor unit;
- changing a viewpoint of the image by moving the displayed part of the wide viewing angle image in response to the motion of a head of the user wearing the head-mounted display;
- computing, by a control processor, coordinates in the virtual space in which a line of sight direction of the user is from a measurement value of the sensor unit; and
- controlling, by the control processor, an element other than the viewpoint of the image using the line of sight of the user as an input signal when the coordinates in the line of sight direction is located at the one or more objects,
- wherein the controlling an element other than the viewpoint of the image comprises:
  - displaying, by the control processor, a cursor indicating the line of sight direction of the user on the screen,
- wherein the controlling an element other than the viewpoint of the image comprises:
  - operating, by the control processor, in a first mode and a second mode shifting between the first mode and the second mode, the first mode in which the image displayed on the display unit changes in the viewpoint of the image based on the cursor indicating the line of sight direction of the user, and the second mode in which the element other than the viewpoint of the image is controlled using the cursor indicating the line of sight of the user as the input signal.

* * * * *